March 24, 1964      E. V. SCHNEIDER      3,126,506
REMOTE CONTROL SYSTEM FOR POSITIONING A MOTOR DRIVEN LOAD
Filed April 3, 1961      2 Sheets-Sheet 1

*INVENTOR.*
EMMOR V. SCHNEIDER
BY Woodling, Krost,
Granger and Rust
ATTORNEYS

March 24, 1964     E. V. SCHNEIDER     3,126,506
REMOTE CONTROL SYSTEM FOR POSITIONING A MOTOR DRIVEN LOAD
Filed April 3, 1961     2 Sheets-Sheet 2
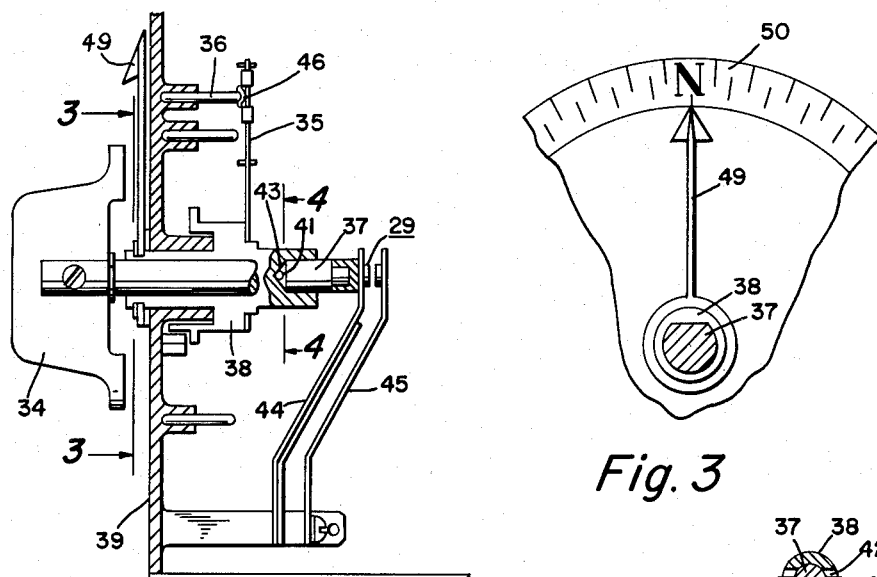
Fig. 2
Fig. 3
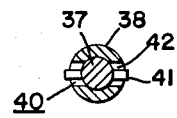
Fig. 4
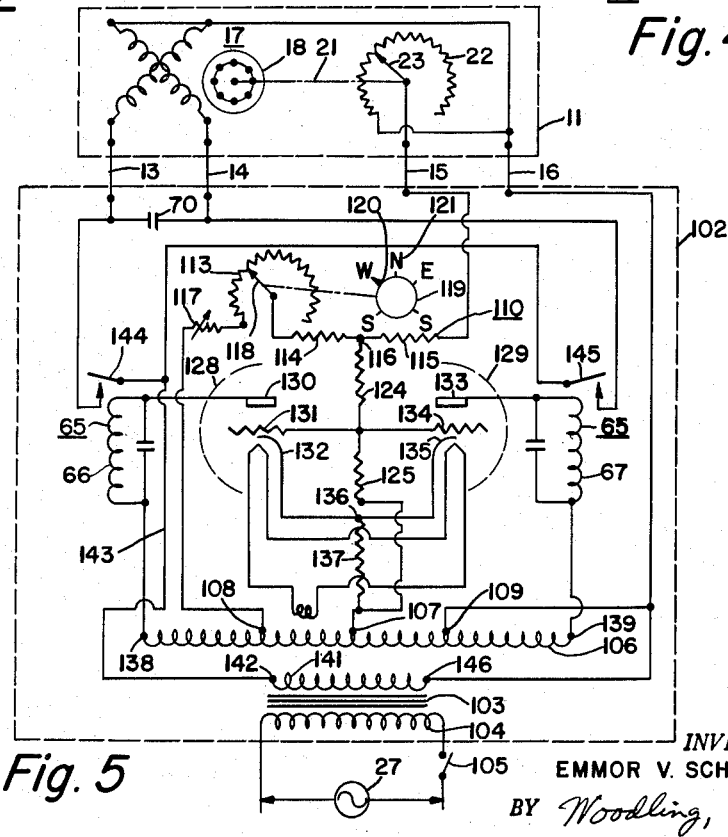
Fig. 5
INVENTOR.
EMMOR V. SCHNEIDER
BY Woodling, Krost, Granger and Rust
ATTORNEYS

# United States Patent Office 3,126,506
Patented Mar. 24, 1964

3,126,506
REMOTE CONTROL SYSTEM FOR POSITIONING
A MOTOR DRIVEN LOAD
Emmor V. Schneider, Alliance, Ohio, assignor to Consolidated Electronics Industries Corp., a corporation of Delaware
Filed Apr. 3, 1961, Ser. No. 100,152
16 Claims. (Cl. 318—28)

The invention relates in general to a remotely controllable device and, more particularly, to an electric motor remotely controlled by a remote control and indicator device in a telemetering type circuit.

The invention may be embodied in a remote control and indicator device for a power unit wherein an electric motor drives an output shaft and also drives a variable impedance. This variable impedance forms a part of a bridge circuit or balanceable circuit and a manually variable impedance in the remote control unit also forms a part of the same bridge circuit. The bridge circuit is energizable from a voltage source and the output of the bridge circuit is applied to amplifier means which has first and second opposing outputs. These first and second opposing outputs establish selective rotation of the power unit and, accordingly, of the first variable impedance in order to rebalance the circuit upon the desired position of the remotely controlled power unit being reached. One use for such a remotely controlled power unit is in antenna rotators, wherein a directional antenna is rotated by a power unit as controlled from a remote control unit, for example, within a building in connection with radio equipment.

An object of the invention, accordingly, is to provide a balanceable bridge circuit in a telemetering circuit, which bridge circuit may be varied in either direction from neutral.

Another object of the invention is to provide a bridge circuit having an output voltage of selectively opposing signals respectively amplified by first and second amplifier means to selectively control the rotational direction of an electric motor.

Another object of the invention is to provide a remotely controllable device which is highly sensitive and has a high degree of accuracy of reproduction of the desired position of the power unit.

Another object of the invention is to provide a remotely controlled device in which the power unit cannot get out of step with the control and indicator unit.

Another object of the invention is to provide a balanceable bridge circuit wherein the variation of an element of one of the arms of the bridge circuit brings a change in another element in the same arm of the bridge circuit, to maintain constant impedance of the bridge circuit and, consequently, constant deflection sensitivity under all conditions of balance of the bridge circuit.

Another object of the invention is to provide a bridge controlled motor circuit wherein a variable impedance driven by the motor and a second impedance are part of the bridge circuit and relative changes in value of the impedances establishes a bridge output voltage which is amplified and used to control energization of the motor to thus drive the variable impedance toward rebalance of the bridge.

Another object of the invention is to provide a telemetering type circuit with a bridge circuit having an output unbalanceable by a variable impedance and rebalanced by rotation of another variable impedance driven in accordance with the power unit being controlled, with the output of the bridge being amplified to establish sensitivity and accuracy in the circuit.

Other objects and a fuller understanding of this invention may be had by referring to the following description and claims, taken in conjunction with the accompanying drawings, in which:

FIGURE 2 is a sectional view through the manually variable rheostat.

FIGURE 3 is a sectional view on line 3—3 of FIGURE 2 showing the indicator.

FIGURE 4 is a sectional view on line 4—4 of FIGURE 2 showing a detail of the lost motion device, and FIGURE 5 is a schematic diagram of a simplified circuit.

Figure 1:
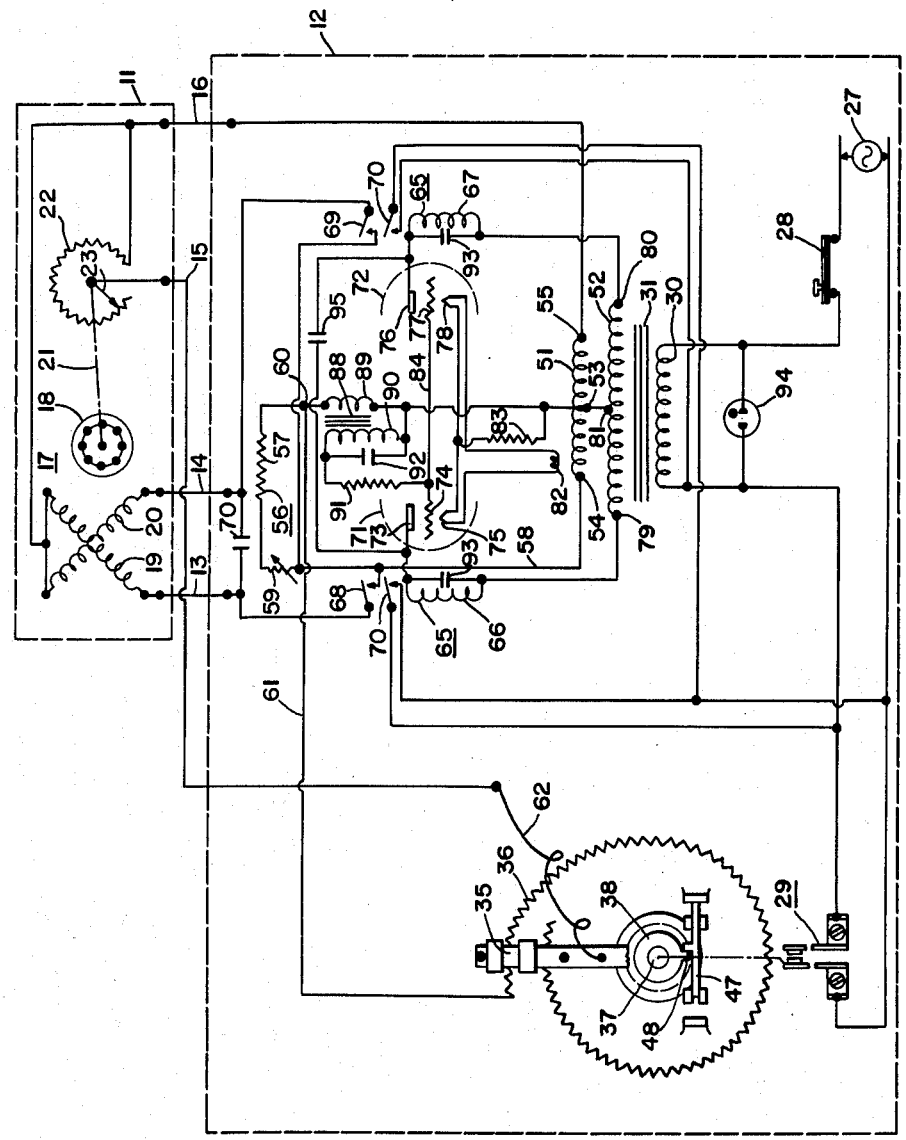
FIGURE 1 shows a schematic diagram of the preferred embodiment of the invention.

FIGURE 1 shows a power unit 11 and a remote control and indicator device 12 interconnected by a plurality of conductors 13, 14, 15, and 16. The power unit 11 includes a drive motor, in this case shown as a reversible capacitor induction motor 17, having a rotor 18 and first and second field windings 19 and 20. The rotor 18 has an output shaft 21 to drive any suitable load to be remotely controlled and this may be a low-speed output shaft driven through gearing to rotate an antenna or other load. A rheostat 22 has a slide arm 23 driven in accordance with rotation of the motor 17. This rheostat 22 is one form of a variable impedance.

The remote control and indicator device 12 derives power from any suitable power source such as the alternating voltage source 27. This may be supplied through an overload protective device 28 and primary switch means 29 to the primary 30 of a transformer 31. A manual knob 34, shown in FIGURE 2, establishes rotation of a slide arm 35 on a second rheostat 36. The knob 34 is fastened on a shaft 37 journalled in a hub 38, in turn journalled on a frame 39. A lost motion connection 40, better shown in FIGURE 4, is provided between the shaft 37 and the hub 38. This lost motion connection includes a cross pin 41 in the shaft 37. This cross pin 41 lies in a slot 42 in the hub 38. Accordingly, a small rotation of a few degrees of the shaft 37 is required before the hub 38 follows such rotation. As shown in FIGURE 2, the forward end 43 of the slot 42 is V-shaped in longitudinal cross section. Accordingly, as the knob 34 is rotated, the shaft 37 moves axially inwardly against the urging of a blade 44 of the primary switch means 29. The primary switch means 29 includes a second blade 45 and this inward axial movement closes the contacts of the primary switch means 29. Accordingly, the switch means 29 is actuated in accordance with the lost motion connection 40. The slide arm 35 is carried on the hub 38 and accordingly, after the lost motion is taken up, the knob 34 will rotate the slide arm 35. The slide arm 35 loosely carries a slide contact 46 which may move lengthwise on the arm 35 so as to maintain contact with the generally spirally wound rheostat 36. A lost motion stop 47 is engageable by a lug 48 on the hub 38 to permit rotation of the contact arm 35 limited to approximately 360°. The hub 38 carries an indicator needle or pointer 49 which cooperates with suitable indicator 50.

The transformer 31 has secondary winding means shown as a first secondary winding 51 and a second secondary winding 52. The secondary winding 51 has a center tap 53 and end terminals 54 and 55 which are terminals of opposite voltage polarity relative to the center tap 53. This secondary winding 51 is the energization source for a bridge circuit 56 of which a first resistance 57 forms a part. This resistance 57 generally may be considered as the first leg of the bridge and the two rheostats 22 and 36 may generally be considered as the second leg of the bridge. The end terminals 54 and 55 of the secondary 51 may be considered as the input terminals of this bridge and, accordingly, the secondary 51 itself forms the third and fourth legs of the bridge or alternatively a center tapped resistance may be connected in parallel with the secondary 51 to act as the third and fourth legs. The conductor 16 connects one end of the rheostat 22 to the secondary terminal 55. A conductor 58 connects the secondary terminal 54 through a balancing rheostat 59 to the first resistance 57. A terminal 60 is connected at the other end of the resistance 57 and this terminal may be considered the first output terminal of the bridge 56, with the center tap 53 being the second output terminal. A conductor 61 connects terminal 60 to the rheostat 36, and a flexible lead 62 and the conductor 15 connect the slide arm 35 of the rheostat 36 to the slide arm 23 of the rheostat 22. Thus, the two rheostats 22 and 36 are connected in series in the second leg of the bridge circuit 56. The power unit 11 and remote control device 12 may be placed at any desired distance and, hence, the interconnecting conductors 13–16 may be of any length. To compensate for varying lengths and resistances of these conductors 13–16, the balancing rheostat 59 has been provided to permit variation in the total resistance in the first leg of the bridge circuit 56 and, thus, to control the balance point of the bridge.

The output terminals 60 and 53 of the bridge circuit 56 supply a signal which is selectively in phase or out of phase relative to the voltage between terminals 53 and 55, for example. It is thus seen that there is essentially a 180° reversal of phase of the bridge output voltage relative to the bridge input voltage as a reference. This selectable instantaneous polarity bridge output voltage is used to control selective rotational direction of the motor 17. The motor 17 is energized through relay means 65 shown as having first and second relay operating coils 66 and 67. The relay coil 66 controls a normally open relay contact 68 and the second relay coil 67 controls a normally open relay contact 69. With the transformer 31 energized, terminal 55 of the secondary 51 supplies energization through conductor 16 to one end of both field windings 19 and 20. Terminal 54 of the secondary 51 supplies energization through relay contact 68 and conductor 13 to the field winding 19 plus a leading current via a capacitor 70 to the other field winding 20 for rotation in one direction. When relay contact 68 is open and relay contact 69 closed, then terminal 54 supplies energization directly through conductor 14 to the field winding 20 and a leading current to field winding 19 for motor rotation in the opposite direction. The selective energization of the relay operating coils 66 and 67 is in accordance with the selected instantaneous polarity of voltage of the output of the bridge circuit 56.

The relay means 65 also include primary contact means 70 which are normally open and are closed upon energization of either relay operating coil 66 or 67. Such contact closure is in parallel with the primary switch means 29 to maintain energization of the transformer 31.

Energization of the relay coils 66 and 67 is effected by first and second amplifiers 71 and 72 respectively. These amplifiers are shown as vacuum triode amplifiers, although other forms may be suitable. Amplifier 71 includes an anode 73, a grid or control element 74 and a cathode 75 shown as a filamentary cathode. Similarly, the second amplifier 72 includes an anode 76, grid 77 and cathode 78. The anodes 73 and 76 are connected through the operating coils 66 and 67, respectively, to opposite end terminals 79 and 80 on the secondary winding 52. This secondary 52 has a center tap 81 connected to the center tap 53 to establish a common neutral or mid-point for the input and output circuits of the amplifiers 71 and 72. A secondary winding 82 is used to energize the filamentary cathodes 75 and 78. A cathode biasing resistor 83 connects the center tap of the cathodes 75 and 78 to the secondary winding center tap 53. A conductor 84 interconnects the grids 74 and 77. The parallel input of the amplifiers 71 and 72, namely at the grids and cathodes thereof, is supplied from the output of the bridge circuit 56. To achieve increased sensitivity, this bridge output is supplied to the amplifier input through a step-up transformer 88. This transformer has a primary 89 connected across the bridge output and a secondary 90 connected through a grid current limiting resistor 91 to the input of the amplifiers 71 and 72. The cathode biasing resistor 83 provides self-biasing to these triode amplifiers and, accordingly, the grid 74 and 77 are normally negatively biased. Accordingly, the step-up transformer 88, since it works into a negatively biased amplifier, passes practically no current at the instant of relay contact closure and, accordingly, may have a very high voltage step-up ratio in the order of 100:1 with a very small physical size. This is because only very fine wire need be used. A capacitor 92 may be connected across the secondary 90 to nearly resonate the transformer 88 to the source frequency. This increases the output voltage and primary impedance of this step-up transformer 88, and insures correct phase relation between the signal applied to the grids of the amplifier tubes and the signal applied to the plates. Capacitors 93 may also be connected across the relay operating coils as one means of preventing relay chattering. A pilot light, for example a neon pilot light 94, may be connected across the transformer primary 30 as an indicator that the remote control device is in operation. A capacitor 95 of small value may be connected between the two anodes 73 and 76 to provide a small circulating alternating current through the relay coils 66 and 67 and thus preclude the possibility of the relay armatures sticking closed due to the essentially unidirectional current through each relay coil.

*Operation*

One use for this telemetering circuit is in the remote control of an antenna rotator which may be rotated 360°. Accordingly, the indicator needle 49 and the cooperating indicia 50 may be calibrated in a full 360° to indicate North, East, South and West. The rheostat 22 in the power unit 11 may be constructed similarly to the rheostat 36 to permit a full 360° rotation of the rheostat slide arm 23. Alternatively, the gearing to the potentiometer 22 may be such that a standard potentiometer with about 300° full rotation may be used with the output shaft 21 rotating 360°.

The figures of the drawing show the rheostat 36 as against one rotational stop and as shown in FIGURE 3, this might be calibrated to be the North position. Accordingly, the indicator needle 49 may then be rotated, for example, in a clockwise direction, a full 360° before the other rotational stop is reached. When the operator moves the manual knob 34 and turns it clockwise, then the shaft 37 at the same time moves axially inwardly because of the V-shaped section 43 to close the primary switch means 29. This is the lost motion connection between the knob 34 and the pointer 49 and this lost motion connection may be only a few degrees. Accordingly, the pointer or needle 49, by its movement, indicates the desired rotational direction of the power unit 11 and the ultimate position of the pointer 49 indicates the desired ultimate position of the power unit 11.

The closing of the primary switch means 29 energizes the transformer 31 to energize the entire circuit. The pilot light 94 will be illuminated to indicate that the remote control device 12 is in operation. The amplifiers 71 and 72 may be a twin triode of the rapid filament heating type such as the type 3A5 and, accordingly, the filaments 75 and 78 may be heated in about ½ second. The rotation of the knob 34 will change the impedance value of the rheostat 36. Both resistances 36 and 22 are in series and both may be linear resistances of any suitable value, for example, 100 ohms. Initially, rheostat 36 had a minimum resistance and rheostat 22 had a maximum resistance. Now, with the assumed clockwise rotation of the rheostat arm 35, for example to the "East" position, this would be an addition of about 25% in the resistance in the second leg of the bridge circuit which includes these two rheostats. This unbalances the bridge and an output voltage is developed at the bridge output terminals which has a component instantaneously in phase with the bridge input voltage from terminals 53 to 54. Accordingly, during those half cycles when terminal 54 and, hence, terminal 79 is positive relative to the center taps, then the anode 73 will be positive and the incoming signal on the grid 74 will also be positive. Relay coil 66 will then be energized to close relay contacts 68 and cause the rotor 18 to rotate in a clockwise direction. This will cause a gradual decrease in the resistance of the rheostat 22.

During this time, the anode 76 will be positive on the alternate half cycles but the grid 77 is negative. Hence, this amplifier 72 will not conduct.

The energization of the relay coil 66 not only closed contact 68 but also closed contact 70 to maintain energized the transformer 31. Thus, the transformer 31 remains energized even though the primary switch means 29 is opened by release of pressure on the manual knob 34.

Continued rotation of the rotor 18 continues to rotate the rheostat slide arm 23 in a clockwise direction until the impedance thereof has been reduced to about 75% of its maximum value. At this point, the total series resistance of rheostats 22 and 36 will again be such as to establish a balanced condition of the bridge 56. Accordingly, the bridge output signal reaches a null and amplifier 71 and relay coil 66 are de-energized. This de-energizes the entire circuit with opening of the relay contact 70 and the rotor 18 stops at the desired position. If now the manual knob is rotated 20° counter-clockwise, for example, this again closes the primary switch means 29 to energize the transformer 31. The decrease in resistance in rheostat 36 unbalances the bridge circuit 56 and now the bridge output voltage has a component in phase with the anode voltage applied to amplifier 72. Accordingly, this amplifier and its associated relay operating coil 67 are energized closing contact 70 to maintain energized the entire circuit. Also, relay contact 69 closes to effect counter-clockwise rotation of the rotor 18. This increases the resistance of rheostat 22 until the total resistance in the second leg of the bridge circuit has been increased to a point whereat the bridge is balanced and then the entire circuit again becomes deenergized.

The circuit of FIGURE 1 has the feature of not maintaining the entire circuit energized unless desired by actuation of the manual knob 34. This may be advantageous in such circuits as antenna rotators wherein it may not be desired to change the direction of the antenna, except perhaps once a week. Thus, when the circuit of FIGURE 1 is not being used, the entire circuit is de-energized.

FIGURE 5 shows a modified and simplified circuit wherein the power unit 11 may be controlled by a remote control and indicator device 102. The power unit 11 again includes the motor 17 and rheostat 22 with the movable slide arm 23 and, again, conductors 13, 14, 15 and 16 are used to interconnect the power unit 11 and the remote control device 102. This remote control device 102 supplies power through the relay means 65 from the voltage source 27 by way of transformer means 103. This transformer means has a primary 104 which is shown as being energized through a switch 105. A first secondary 106 on the transformer 103 has a center tap 107 and first and second terminals 108 and 109 which are of opposite voltage polarity relative to the center tap 107. These terminals 108 and 109 may be considered the input terminals of a bridge circuit 110 which includes the first rheostat 22, a second rheostat 113 and resistances 114 and 115. The junction of the resistances 114 and 115 is a terminal 116 which may be considered the first output terminal of the bridge circuit 110, and the center tap 107 may be considered the second output terminal of this bridge circuit. The rheostat 113 and resistance 114 may be considered the first leg of the bridge circuit and the resistance 115 and rheostat 22 may be considered the second leg of this bridge circuit. A balancing rheostat 117 may be used in the bridge circuit 110, for example in the first leg, in order to compensate for various lengths and impedances of the conductors 13 to 16. The rheostat 113 has a movable contact arm 118 connected to be moved by a manual knob 119. This manual knob 119 also moves an indicator such as the pointer 120 cooperating with indicia 121.

A grid current limit resistor 124 and a grid biasing resistor 125 are connected in series across the output terminals 116 and 107 of the bridge circuit. The output of this bridge circuit is connected through first and second amplifiers 128 and 129 acting in opposition. These amplifiers may take the form of a twin triode with the amplifier 128 having an anode 130, a control grid 131, and cathode 132. The amplifier 129 has an anode 133, control grid 134 and cathode 135. The grids are connected together to the junction of the resistances 124 and 125. The cathodes are interconnected at a terminal 136 which is connected to the center tap 107 through a cathode biasing resistor 137. The anodes 130 and 133 are connected through the relay operating coils 66 and 67 respectively to end terminals 138 and 139 of the secondary 106.

A second secondary 141 is provided on the transformer 103 and a first end terminal 142 thereof is connected through a conductor 143 to relay contacts 144 and 145 actuated respectively by the relay operating coils 66 and 67. Upon closure of the relay contacts 144, the conductor 13 is energized directly for one rotation of the rotor 18, and upon closure of the relay contacts 145, conductor 14 is energized directly for the opposite rotation of the rotor 18. A second end terminal 146 of the secondary 141 is connected to conductor 16.

*Operation*

With the primary switch 105 closed, the transformer 103 is energized and the device is energized for operation. The manual knob 119 has been shown as being in the "West" position, indicating that the power unit 17 is currently aimed toward the West. The rheostat 113 has been shown as having approximately 270° of rotation, as has the rheostat 22, and the manual knob 119 also has approximately the same arc of rotation. This illustration is for simplification in the drawing and the 360° rotation of any of the rheostats may be provided as shown in rheostat 36 of FIGURE 1.

If now the manual knob 119 is rotated clockwise to the "East" position, for example, the effective resistance of rheostat 113 will be increased from about ¼ to about ¾ of its maximum value. This will increase the total resistance and voltage in the first leg of the bridge circuit 110 and, thus, a voltage will exist from terminals 107 to 116 which has a component in phase with the instantaneous voltage between the center tap 107 and the terminal 139. This is the anode voltage on the amplifier 129 and, accordingly, this amplifier will be energized, whereas amplifier 128 will not, inasmuch as the grid thereof will be negative whenever the anode 130 is positive. This positive voltage on the grid 134 makes the amplifier 129 conduct, hence, relay operating coil 67 is energized and relay contact 145 is closed so that the rotor 18 rotates in a clockwise direction. This increases the resistance of rheostat 22. The bridge circuit 110 remains unbalanced and the entire circuit remains energized with the rotor 18 driving the rheostat slide arm 23 in a clockwise direction until the resistance of the rheostat 22 again approximately equals the resistance of the rheostat 113. When the resistance in the two legs of the bridge circuit are equal, the bridge circuit is balanced and the amplifier 129 and relay operating coil 67 are de-energized. This shuts off the motor 17.

If the knob 119 now is rotated counter-clockwise to any position, for example to the "North" position, this unbalances the bridge circuit in a direction so that a positive voltage is applied to grid 131 when the anode 130 is positive and, thus, amplifier 128 will conduct. This energizes relay coil 66 and closes relay contacts 144 to drive the rotor 18 and rheostat slide arm 23 in a counter-clockwise direction until the slide arm 23 is about in the mid-position. This rebalances the bridge and de-energizes amplifier 128 and relay operating coil 66 to de-energize the motor 17.

The circuit of FIGURE 5 has the advantage that should any external force shift the position of the output shaft 21 in the power unit 11, this would unbalance the bridge and cause conduction of the appropriate amplifier 128 or 129 to again rebalance the bridge by moving the output shaft 21 to its desired position as selected by the manual knob 119. The resistances 114 and 115 are provided in the bridge circuit in order to provide a certain minimum impedance in this bridge circuit even though both rheostats 22 and 113 are at or near their minimum resistance positions.

The circuit of FIGURE 1 also has the advantage over the circuit of FIGURE 5 in having greater sensitivity due to the extra amplification provided by the step-up transformer 88. Also, the circuit of FIGURE 1 has the advantage of linearity of sensitivity since any increase in the resistance of rheostat 36 is compensated by a corresponding decrease in the resistance of the rheostat 22, thus, these two resistance values are the complement of each other and the sum of these two resistance values always seeks a constant value as determined by appropriate motor rotation. In the circuit of FIGURE 5, the primary switch 105 may be controlled in actuation in a manner similar to the primary switch means 29 of the circuit of FIGURE 1.

The circuits of FIGURES 1 and 5 show different arrangements of transformers for supplying alternating voltage energy to the bridge circuits, to the amplifiers and to the motor 17. The circuit of FIGURE 1 permits utilization of a fine wire high voltage secondary 52 to supply higher voltage and lower current to the amplifiers 71 and 72 and the secondary 51 may be made of lower voltage e.g. 24–30 volts with larger gauge wire to supply the larger current requirements of the bridge circuit 56 and the motor 17.

In both circuits of FIGURES 1 and 5 the relay means 65 may be separate or combined relays. If the armatures actuated by the two relay operating coils 66 and 67 are combined or interconnected, then this will assure that both sets of contacts 68 and 69 are not closed at the same instant, such as by sticking or magnetic retentivity. With this construction, the capacitor 95 of FIGURE 1 may be eliminated.

The terminals of the second rheostat 36 may be considered to be control terminals, across which a second impedance is placed. Any change in value of this second impedance is a change in relative values of the rheostats 36 and 22, and accordingly, the bridge 56, or bridge 110, will become unbalanced. This establishes a bridge output voltage which is amplified by the amplifier means 71—72, and accordingly the motor 17 is energized to drive the rheostat 22 toward a rebalanced condition of the bridge. When this rebalanced condition is realized, the entire circuit is de-energized and the motor 17 and rheostat cease movement.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A remote control device for a power unit to drive an output shaft with the device and power unit interconnected by a plurality of electrical conductors, comprising in combination, an electric motor in said power unit, a variable impedance in said power unit driven in accordance with rotation of said motor to vary the impedance thereof in accordance with rotation of said motor; said control device including a manual knob rotatable to effect energization of said motor, an indicator moved with said knob to provide indication of the desired position of the output shaft, a lost motion connection between said knob and said indicator, switch means connected to be actuated in accordance with said lost motion connection, transformer means having secondary winding means, a bridge circuit, means to energize said bridge circuit from said secondary winding means in accordance with actuation of said switch means, a second variable impedance, means including said plurality of conductors to connect said first and second variable impedances as part of said bridge circuit, output terminals on said bridge circuit, amplifier means connected to the output terminals of said bridge circuit so that when said bridge circuit is unbalanced the amplifier means is effective, and means including said plurality of conductors connecting said amplifier means in circuit with said secondary winding means and said electric motor to effect rotation of said motor.

2. A remote control device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof in accordance with selected rotation of said motor; said control device including a manually rotatable knob, an indicator moved by said knob, a lost motion connection between said knob and indicator, switch means actuated in accordance with movement of said lost motion connection, transformer means having secondary winding means and adapted to be energized by actuation of said switch means, a bridge circuit, means to energize said bridge circuit from said secondary winding means, a second variable impedance, means including said plurality of conductors to connect said first and second variable impedances as part of said bridge circuit, output terminals on said bridge circuit, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, and means including said plurality of conductors connecting said first and second amplifier means in circuit with said secondary winding means and said electric motor to effect selective rotation of said motor.

3. A remote control and indicator device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof in accordance with selected rotation of said motor; said control and indicator device including a manual knob journalled for rotation to select the desired rotation of said motor, an indicator moved in accordance with said knob to provide indication of the selected rotational direction and ultimate position of the output shaft, transformer means having secondary winding means, a lost motion connection between said manual knob and said indicator, switch means connected to be actuated in accordance with movement of said lost motion connection, a bridge circuit having first and second legs, means to energize said bridge circuit from said secondary winding means in accordance with actuation of said switch means, a second variable impedance moved in accordance with movement of said manual knob, means including said plurality of conductors to connect said first and second variable impedances as part of said first and second legs of said bridge circuit, output terminals on said bridge circuit, amplifier means connected to the output terminals of said bridge circuit, first and second relay means connected to the output of said amplifier means so that when said bridge circuit is unbalanced in one direction the first relay means is effective and when the bridge circuit is unbalanced in the other direction said second relay means is effective, and means including said plurality of conductors connecting said first and second relay means in circuit with said secondary winding means and said electric motor to effect selective rotation of said motor.

4. A remote control and indicator device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof, in accordance with selected rotation of said motor; said control and indicator device including a manual knob journalled for rotation to select the desired rotation of said motor, an indicator moved in accordance with said knob to provide indication of the selected rotational direction and ultimate position of the output shaft, a lost motion connection between said knob and said indicator, primary switch means connected to be actuated in accordance with movement of said lost motion connection, transformer means adapted to be energized by actuation of said primary switch means, secondary winding means on said transformer means, a bridge circuit having first and second legs, means to energize said bridge circuit from said secondary winding means, a second variable impedance moved in accordance with movement of said manual knob, means including said plurality of conductors to connect said first and second variable impedances as part of said first and second legs of said bridge circuit, output terminals on said bridge circuit, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, first and second relay means having first and second operating windings connected for respective energization in accordance with the outputs of said first and second amplifier means, and means including said plurality of conductors connecting said first and second relay means in circuit with said secondary winding means and said electric motor to effect selective rotation of said motor.

5. A remote control and indicator device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof in accordance with selected rotation of said motor; said control and indicator device including a manual knob journalled for rotation to select the desired rotation of said motor, an indicator moved in accordance with said knob to provide indication of the selected rotational direction and ultimate position of the output shaft, a lost motion connection between said knob and said indicator, primary switch means connected to be actuated in accordance with movement of said lost motion connection, transformer means adapted to be energized by actuation of said primary switch means, secondary winding means on said transformer means having a center tap and having terminal means of opposite voltage polarity relative to said center tap, a bridge circuit having first and second legs, means to energize said bridge circuit from opposite polarity terminals of said secondary winding means, a second variable impedance moved in accordance with movement of said manual knob, means including said plurality of conductors to connect said first and second variable impedances as part of said first and second legs of said bridge circuit, output terminals on said bridge circuit including said center tap, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, relay means having first and second operating windings connected respectively in the outputs of said first and second amplifier means, first and second contact means actuated by respective energization of said first and second operating windings, and means including said plurality of conductors connecting said first and second contact means in circuit with said secondary winding means and said electric motor to effect selective rotation of said motor.

6. A remote control and indicator device for a power unit to drive an output shaft with the device and power unit interconnected by a plurality of electrical conductors, comprising in combination, a reversible electric motor in said power unit, a variable resistance in said power unit driven in accordance with rotation of said motor to increase or decrease the resistance thereof in accordance with selected rotation of said motor; said control and indicator device including a manual knob journalled for rotation to select the desired rotation of said motor, an indicator moved in accordance with said knob to provide indication of the selected rotational direction and ultimate position of the output shaft, a lost motion connection between said knob and said indicator, primary switch means connected to be actuated in accordance with movement of said lost motion connection, transformer means adapted to be energized by actuation of said primary switch means, secondary winding means on said transformer means having a center tap and having terminal means of opposite voltage polarity relative to said center tap, a bridge circuit having first and second legs connected across opposite polarity terminals of said secondary winding means with at least part of said secondary winding means forming third and fourth legs of said bridge circuit, a second variable resistance moved in accordance with movement of said manual knob, means including said plurality of conductors to connect said first and second variable resistances as part of said first and second legs of said bridge circuit, output terminals on said bridge circuit including said center tap, first amplification means connected to the output terminals of said bridge circuit, second and third oppositely acting amplifier means connected for operating voltages from said secondary winding means, means connecting the output of said first amplification means to the inputs of said second and third amplifier means, whereby when said bridge circuit is unbalanced in one direction the second amplifier means is effective and when the bridge circuit is unbalanced in the other direction said third amplifier means is effective, relay means having first and second operating windings connected respectively in the outputs of said second and third amplifier means, first and second contact means actuated by respective energization of said first and second operating windings, and means including said plurality of conductors connecting said first and second contact means in circuit with said secondary winding means and said electric motor to effect selective rotation of said motor.

7. A remote control and indicator device for a power unit and operable from a voltage source, comprising in combination, an electric motor in said power unit, an output shaft connected to be driven by said motor, a first variable impedance connected to be driven in timed relation to said output shaft; said control and indicator device including a bridge circuit, a second variable impedance, means connecting said impedances as part of first and second legs of said bridge, an indicator moved in accordance with movement of said second variable impedance, lost motion means, means to move said indicator through said lost motion means, switch means actuated in accordance with movement of said lost motion means, means connecting said bridge for energization through said switch means from said voltage source, output terminals on said bridge, an amplifier having an anode, cathode and control means, relay means including an operating coil, means connecting said anode means of said amplifier to said operating coil, means connecting the output of said bridge to apply an input signal to said cathode and control means upon unbalance of said bridge, contact means on said relay means actuated by energization of said relay operating coil, means connecting said motor to the voltage source through said contact means to energize said motor for rotation, and movement of said second variable impedance causing unbalance of said bridge to establish an output voltage at said bridge output terminals to effect operation of said amplifier and, hence, rotation of said motor and of said first variable impedance toward a rebalance of said bridge.

8. A remote control and indicator device for a power unit, comprising in combination, a reversible electric motor in said power unit, a low speed output shaft connected to be driven by said motor, a first rheostat connected to be driven by said motor in timed relation to said output shaft; said control and indicator device including transformer means, center tapped secondary winding means on said transformer means having voltage terminals of opposite polarity relative to said center tap, a second rheostat, a bridge circuit, means connecting in series said two rheostats as part of first and second legs of said bridge, means connecting said bridge first and second legs to opposite polarity voltage terminals of said secondary winding means with said center tap thereof being an output terminal of said bridge, the junction between said first and second legs being another output terminal of said bridge, first and second triode amplifiers each having an anode, grid and cathode, relay means including first and second operating coils, means connecting said anodes to opposite polarity voltage terminals of said secondary winding means through said first and second operating coils, respectively, means connecting together said grids, means connecting together said cathodes and connecting same to said center tap of said secondary winding means, means connecting the output of said bridge to apply an input signal to said grids and cathodes upon unbalance of said bridge, first and second contact means on said relay means selectively actuated by energization of said first and second relay operating coils, means connecting terminals of said secondary winding means through said first and second contact means to selectively energize said motor for rotation in opposite directions, a manual knob journalled for rotation in said control device, lost motion means connecting said knob to said second rheostat to move same to a desired position and to thus unbalance said bridge, an indicator moved in accordance with movement of said second rheostat, third contact means actuated in accordance with movement of said lost motion means to energize a primary of said transformer means, fourth contact means actuated by energization of said relay means to maintain said transformer means energized, and unbalance of said bridge establishing an output voltage at said bridge output terminals which instantaneously is of selected polarity relative to said center tap of said secondary winding means to cause selective conduction of said first and second triodes and, hence, a selected rotational direction of said motor and of said first rheostat to rebalance said bridge and, thus, de-energize said transformer means.

9. A remote control and indicator device for a power unit, comprising in combination, a reversible electric motor in said power unit, a low speed output shaft connected to be driven by said motor, a first rheostat connected to be driven by said motor in timed relation to said output shaft; said control and indicator device including transformer means, center tapped secondary winding means on said transformer means having voltage terminals of opposite polarity relative to said center tap, a second rheostat, a bridge circuit, means connecting in series said two rheostats as part of first and second legs of said bridge, means connecting said bridge first and second legs to opposite polarity voltage terminals of said secondary winding means with said center tap thereof being an output terminal of said bridge, the junction between said first and second bridge legs being another output terminal of said bridge, a step-up transformer having a primary connected to said bridge output terminals, first and second triode amplifiers each having an anode, grid and cathode, relay means including first and second operating coils, means connecting said anodes to opposite polarity voltage terminals of said secondary winding means through said first and second operating coils, respectively, means connecting together said grids, means connecting together said cathodes, a secondary on said step-up transformer connected between said grids and cathodes, means connecting said cathodes to said center tap of said secondary winding means, first and second contact means on said relay means selectively actuated by energization of said first and second relay operating coils, means connecting terminals of said secondary winding means through said first and second contact means to selectively energize said motor for rotation in opposite directions, a manual knob journalled for rotation in said control device, lost motion means connecting said knob to said second rheostat to move same to a desired position and to thus unbalance said bridge, an indicator moved in accordance with movement of said second rheostat, third contact means actuated in accordance with movement of said lost motion means to energize a primary of said transformer means, fourth contact means actuated by energization of said relay means to maintain said transformer means energized, and unbalance of said bridge establishing an output voltage at said bridge output terminals which instantaneously is of the selected polarity relative to said center tap of said secondary winding means to cause selective conduction of said first and second triodes and, hence, a selected rotational direction of said motor and of said first rheostat to rebalance said bridge and, thus, de-energize said transformer means.

10. A remote control and indicator device for a power unit, comprising in combination, a reversible electric motor in said power unit, a low speed output shaft connected to be driven by said motor, a linear rheostat connected to be driven by said motor in timed relation to said output shaft; said control and indicator device including transformer means, center tapped secondary winding means on said transformer means, a second linear rheostat, means connecting in series said two rheostats as one leg of a bridge, an impedance as a second leg of said bridge and connected in series with said first leg at a bridge first output terminal, means connecting said bridge first and second legs to the end terminals of said secondary winding means with said center tap thereof being a second output terminal of said bridge, a step-up transformer having a primary connected to said bridge output terminals, first and second triode amplifiers each having an anode, grid and cathode, relay means including first and second operating coils, means connecting said anodes to end terminals of said secondary winding means through said first and second operating coils, respectively, means connecting together said grids, means connecting together said cathodes, a secondary on said step-up transformer connected between said grids and cathodes, means connecting said cathodes to said center tap of said secondary winding means, first and second contact means on said relay means selectively actuated by energization of said first and second relay operating coils, means connecting end terminals of said secondary winding means through said first and second contact means to selectively energize said motor for rotation in opposite directions, a manual knob journalled for rotation in said control device, lost motion means connecting said knob to said second rheostat to move same to a desired position and to thus unbalance said bridge, an indicator moved with said second rheostat, third contact means actuated in accordance with movement of said lost motion means to energize a primary of said transformer means, fourth contact means actuated by energization of said relay means to maintain said transformer means energized, and unbalance of said bridge establishing an output voltage at said bridge output terminals which instantaneously is of selected polarity relative to said center tap of said secondary winding means to cause selective conduction of said first and second triodes and, hence, a selected rotational direction of said motor and of said first rheostat to rebalance said bridge and, thus, de-energize said transformer means.

11. A remote control and indicator device for a power unit, comprising in combination, a reversible electric motor in said power unit, a low speed output shaft geared to be driven by said motor, a linear rheostat connected to be driven by said motor in timed relation to said output shaft; said control and indicator device including transformer means, a first center tapped secondary winding on said transformer means, a second linear rheostat, means connecting in series said two rheostats as one leg of a bridge, an impedance as a second leg of said bridge and connected in series with said first leg at a bridge first output terminal, means connecting said bridge first and second legs to the end terminals of said first secondary winding with said center tap thereof being a second output terminal of said bridge, a step-up transformer having a primary connected to said bridge output terminals, first and second triode amplifiers each having an anode, grid and filamentary cathode, a second center tapped secondary winding on said transformer means to develop an operating voltage, relay means including first and second operating coils, means connecting said anodes to the ends of said second secondary winding through said first and second operating coils, respectively, means connecting together said grids, means connecting together said cathodes, a secondary on said step-up transformer connected between said grids and cathode, means energizing said filamentary cathodes and connecting same to said center taps of said first and second secondary windings, first and second contact means on said relay means selectively actuated by energization of said first and second relay operating coils, means connecting the end terminals of said first secondary winding through said first and second contact means to selectively energize said motor for rotation in opposite directions, a manual knob journalled for rotation in said control device, lost motion means connecting said knob to said second rheostat to move same to a desired position and to thus unbalance said bridge, an indicator moved with said second rheostat, third contact means actuated in accordance with movement of said lost motion means to energize a primary of said transformer means, fourth contact means actuated by energization of said relay means to maintain said transformer means energized, and unbalance of said bridge establishing an output voltage at said bridge output terminals which instantaneously is of selected polarity relative to said center tap of said first secondary winding to cause selective conduction of said first and second triodes and, hence, a selected rotational direction of said motor and of said first rheostat to rebalance said bridge and, thus, de-energize said transformer means.

12. A bridge controlled motor circuit, comprising, in combination, an electric motor, a variable first impedance driven in accordance with rotation of said motor to vary the impedance thereof in accordance with rotation of said motor, a bridge circuit having an input and an output, a manual knob control, an indicator moved in accordance with movement of said control knob, a lost motion connection between said knob and said indicator, switch means actuated in accordance with movement of said lost motion connection, means including said switch means to energize said bridge input from voltage source means, control terminals, means connecting said control terminals and said variable impedance in said bridge circuit, means connecting a second impedance across said control terminals, amplifier means connected to the output of said bridge circuit so that when said bridge circuit is unbalanced by changes in relative values of said impedances, the amplifier means is effective, and means connecting the output of said amplifier means to control energization of said motor from said voltage source means to effect drive of said motor.

13. An electrical circuit comprising in combination, a control device and a power unit to drive an output shaft with the device and power unit interconnected by a plurality of electrical conductors, an electric motor in said power unit, a variable impedance in said power unit driven in accordance with rotation of said motor to vary the impedance thereof in accordance with rotation of said motor; said control device including, a manually movable control knob, an indicator, lost motion means between said knob and indicator, switch means actuated in accordance with said lost motion means, transformer means having secondary winding means and adapted to be energized by actuation of said switch means, a bridge circuit, means to energize said bridge circuit from said secondary winding means, a second impedance, means including said plurality of conductors to connect said first and second impedances as part of said bridge circuit, output terminals on said bridge circuit, amplifier means connected to the output terminals of said bridge circuit so that when said bridge circuit is unbalanced by changes in relative values of said first and second impedances the amplifier means is effective, and means including said plurality of conductors connecting the output of said amplifier means in circuit with said secondary winding means and said electric motor to effect rotation of said motor.

14. A remote control and indicator device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof in accordance with selected rotation of said motor; said control and indicator device including a manual knob journalled for rotation to select the desired rotation of said motor, an indicator moved in accordance with said knob to provide indication of the selected rotational direction and ultimate position of the output shaft, a lost motion connection between said knob and said indicator, switch means connected to be actuated in accordance with movement of said lost motion connection, a bridge circuit having first and second legs, means to energize said bridge circuit in accordance with actuation of said switch means, a second variable impedance moved in accordance with movement of said manual knob, means including said plurality of conductors to connect said first and second variable impedances as part of said first and second legs of said bridge circuit, output terminals on said bridge circuit, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, and means including said plurality of conductors connecting said first and second amplifier means in circuit with said secondary winding means and said electric motor to effect selective rotation of said motor.

15. A remote control and indicator device for a power unit to drive an output shaft with the device and power unit interconnected by a plurality of electrical conductors, comprising in combination, a reversible electric motor in said power unit, a variable impedance in said power unit driven in accordance with rotation of said motor to increase or decrease the impedance thereof in accordance with selected rotation of said motor; said control and indicator device including a manual knob journalled for rotation to select the desired rotation of said motor, an indicator moved in accordance with said knob to provide indication of the selected rotational direction and ultimate position of the output shaft, a lost motion connection between said knob and said indicator, primary switch means connected to be actuated in accordance with movement of said lost motion connection, transformer means adapted to be energized by actuation of said primary switch means, secondary winding means on said transformer means, a bridge circuit having first and second legs, means to energize said bridge circuit from said secondary winding means, a second variable impedance moved in accordance with movement of said manual knob, means including said plurality of conductors to connect said first and second variable impedances as part of said first and second legs of said bridge circuit, output terminals on said bridge circuit, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, and means including said plurality of conductors connecting said first and second amplifier means in circuit with said secondary winding means and said electric motor to effect selective rotation of said motor.

16. A remote control device for a power unit to drive an output shaft with the device and power unit interconnected by only four electrical conductors, comprising in combination, a reversible electric motor in said power unit, a variable impedance having two terminals in said power unit and driven in accordance with rotation of said motor to increase or decrease the impedance thereof in accordance with selected rotation of said motor; said control device including transformer means having secondary winding means, a bridge circuit, means to energize said bridge circuit from said secondary winding means, a second variable impedance, means including two of said only four conductors to connect said first and second variable impedances as part of said bridge circuit, output terminals on said bridge circuit, first and second oppositely acting amplifier means connected to the output terminals of said bridge circuit so that when said bridge circuit is unbalanced in one direction the first amplifier means is effective and when the bridge circuit is unbalanced in the other direction said second amplifier means is effective, and means including the remaining two of said only four conductors connecting said first and second amplifier means in circuit with said secondary winding means and said electric motor to effect selective rotation of said motor.

References Cited in the file of this patent

UNITED STATES PATENTS

| | | |
|---|---|---|
| 1,586,233 | Anschutz-Kaempfe | May 25, 1926 |
| 2,426,508 | Isserstedt | Aug. 26, 1947 |
| 2,498,957 | Jordan | Feb. 28, 1950 |
| 2,532,723 | Knoop | Dec. 5, 1950 |
| 2,654,057 | Rivenburg | Sept. 29, 1953 |
| 2,737,619 | Shank et al. | Mar. 6, 1956 |
| 2,863,107 | Blauv | Dec. 2, 1956 |